(12) United States Patent
Braduke et al.

(10) Patent No.: US 12,536,256 B2
(45) Date of Patent: Jan. 27, 2026

(54) DEVICE LOGIN AUTHENTICATIONS

(71) Applicant: Hewlett-Packard Development Company, L.P., Spring, TX (US)

(72) Inventors: Rosilet Retnamoni Braduke, Spring, TX (US); Wei Ze Liu, Spring, TX (US); Rajesh A. Shah, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 142 days.

(21) Appl. No.: 18/264,630

(22) PCT Filed: Mar. 10, 2021

(86) PCT No.: PCT/US2021/021748
§ 371 (c)(1),
(2) Date: Aug. 8, 2023

(87) PCT Pub. No.: WO2022/191837
PCT Pub. Date: Sep. 15, 2022

(65) Prior Publication Data
US 2024/0104174 A1   Mar. 28, 2024

(51) Int. Cl.
*H04L 29/06* (2006.01)
*G06F 21/31* (2013.01)
*G06F 21/57* (2013.01)

(52) U.S. Cl.
CPC .............. *G06F 21/31* (2013.01); *G06F 21/57* (2013.01)

(58) Field of Classification Search
CPC .................................. G06F 21/57; G06F 21/31
See application file for complete search history.

(56) References Cited

U.S. PATENT DOCUMENTS

| | | | |
|---|---|---|---|
| 8,892,904 B2 | 11/2014 | Mirashrafi et al. | |
| 9,053,306 B2 | 6/2015 | Yoshigaki et al. | |
| 9,087,187 B1 | 7/2015 | Doane | |
| 9,646,149 B2 | 5/2017 | Carlson et al. | |
| 10,459,822 B1 | 10/2019 | Gondi | |
| 2005/0235148 A1 | 10/2005 | Scheidt et al. | |
| 2012/0054841 A1* | 3/2012 | Schultz | G06F 21/51 726/22 |
| 2012/0179915 A1 | 7/2012 | Horn et al. | |
| 2018/0203988 A1* | 7/2018 | Hamlin | G06F 21/36 |
| 2019/0228144 A1 | 7/2019 | Kermes et al. | |
| 2019/0288858 A1 | 9/2019 | Chow et al. | |
| 2021/0328995 A1* | 10/2021 | Albero | H04L 63/102 |

\* cited by examiner

*Primary Examiner* — Jason K Gee
(74) *Attorney, Agent, or Firm* — Quarles & Brady LLP

(57) ABSTRACT

Examples include a CPU coupled to a controller, the CPU to receive a user credential usable by the login executable code to perform device login authentication, determine a first hash value based on the login executable code, determine a second hash value based on the user credential, obtain a third hash value and a fourth hash value from the controller, wherein the third hash value is a reference hash value for the login executable code, and wherein the fourth hash value is a reference hash value for the user credential, compare the first hash value to the third hash value, compare the second hash value to the fourth hash value, execute an OS login service using the login executable code responsive to the first hash value matching the third hash value and the second hash value matching the fourth hash value.

9 Claims, 5 Drawing Sheets

DEVICE LOGIN AUTHENTICATIONS

BACKGROUND

Some computing or electronic devices include login services that accept a user input password and authenticate access to the computing device based on the password matching a previously stored password. The authentication may be performed via software and using data stored in a manner accessible to a processor of the computing device.

BRIEF DESCRIPTION OF THE DRAWINGS

Various examples will be described below referring to the following figures.

DETAILED DESCRIPTION

Figure 1:
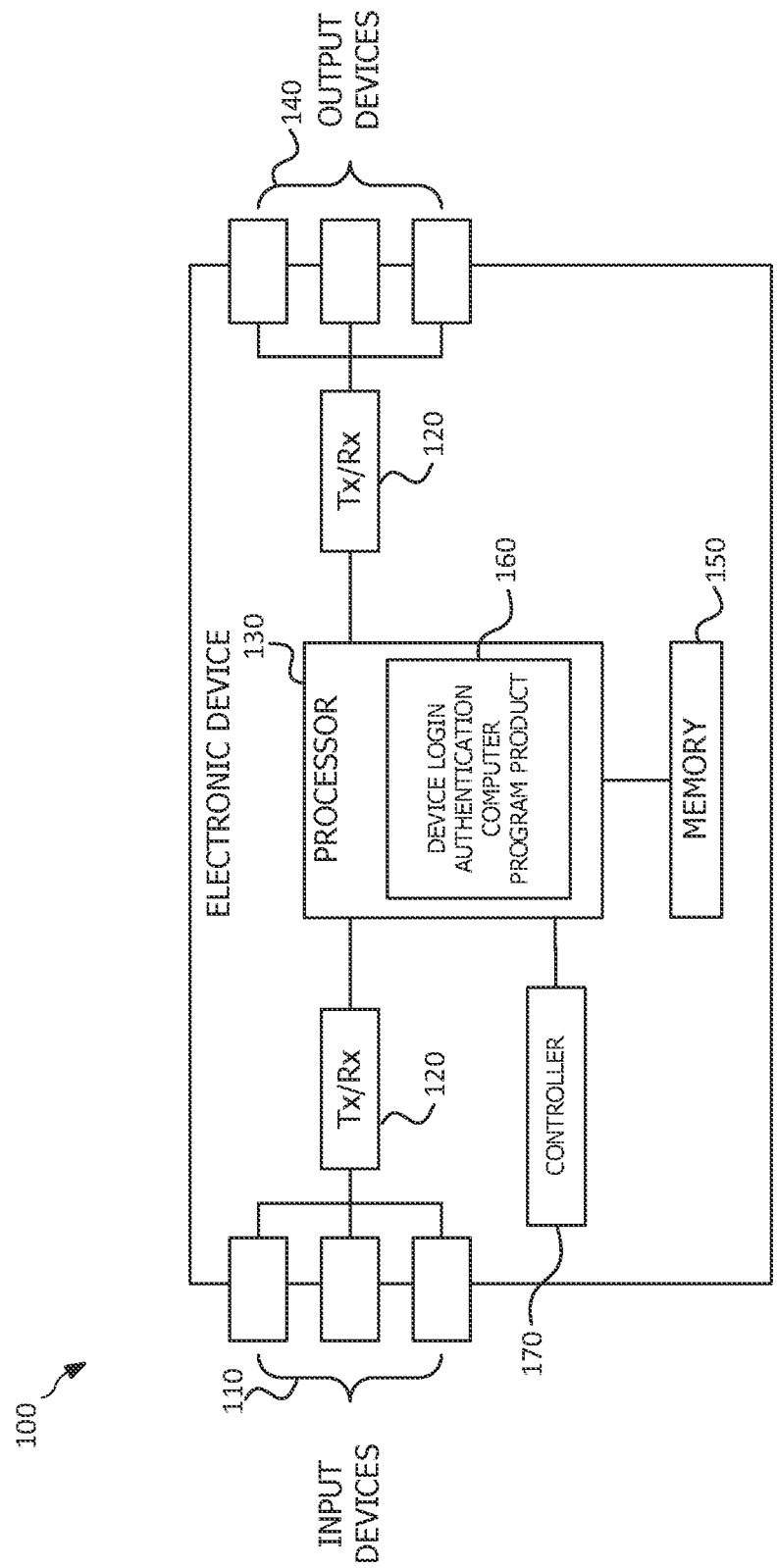
FIG. 1 is an electronic device having a processor and a controller in accordance with various examples.

As described above, some computing or electronic devices include an operating system (OS) login service that accepts a user input password and authenticates access to the computing device based on the password matching a previously stored password. In some examples, the OS login service may be executable code (such as an application or other collection or group of executable code) that operates as a background process on the computing device. The OS login service may execute on the computing device prior to some portions of an OS of the computing device executing (e.g., such as to facilitate login authentication of a user to provide the user with access to the OS). However, this process may leave the authentication subject to reverse-engineering or other access by third-parties, such as malicious actors, who do not provide a correct password. This may allow the third-parties to access the computing device while bypassing the authentication, jeopardizing security of the computing device. For example, various electronic attacks, such as direct memory access, may in some circumstances allow the third-parties to access the computing device while bypassing the authentication.

This disclosure describes examples of a device that includes a controller for device login authentication. The controller may be, for example, a security controller such as an Endpoint Security Controller or other device capable of secure data communication and/or secure storage of data. In some examples, the login authentication includes a pre-authentication security check. The pre-authentication security check, in some examples, is also implemented as a service on the device. For example, the pre-authentication security check may be implemented as a service that executes prior to a user gaining access to an OS of the device or an OS login service of the device that facilitates access to the OS of the device. The pre-authentication security check may be performed by the device to determine whether a hash value of a portion of login executable code (e.g., such as of the OS login service) and a hash value of user credentials (e.g., username and/or password) match respective stored hash values.

For example, responsive to a user entering a password into a user login graphical user interface, a determination may be made as to whether the password is a new password for the user. If the password is a new password, the device may determine (e.g., calculate and/or generate) hash values of a portion of the login executable code of the device and of the password. The determining of the hash value may be according to any suitable hashing process. A new password may be a password provided by a user responsive to the user being prompted for entry of the new password. For example, the user may be prompted for entry of the new password when an account of the user on the device is a new account for which a password has not previously been provided, responsive to expiration of a prior existing password of the user, etc. The hash values of the portion of login executable code and the password may be provided to the controller and may be stored by the controller. In some examples, the hash values are provided to the controller via private Windows Management Instrumentation. Subsequently, the device may execute the login executable code to authenticate the user's access to the device based on the password. If the password is not a new password, but an update of the login executable code has occurred, the device may determine the hash value of a portion of the login executable code and provide the hash value to the controller for storage by the controller with a previously provided hash of the password.

If the password is not a new password and the login executable code has not been updated, responsive to the user entering the password the device may determine hash values of the portion of login executable code and the password. The device may further obtain the stored hash values from the controller and compare the determined hash values to the stored hash values. If the hashes do not match, the device may return to a graphical user interface in which the user provided the password and/or provide an indication of an authentication failure. If the hashes match, the device may execute the login executable code to authenticate the user's access to the device based on the password. In some examples, the pre-authentication security check may provide redundant security to the device login authentication. This redundant security may mitigate risks to the device login authentication such as may exist through a malicious actor or other third-party reverse engineering, or otherwise compromising, some of the login executable code or the device login authentication process. While a password is referenced above and elsewhere herein for the purposes of description of some examples of the disclosure, in other examples a username may be used in the pre-authentication security check of this disclosure in place of, or in addition to, the password.

FIG. 1 is a block diagram depicting an example of an electronic device 100. Electronic device 100 may be any suitable computing or processing device capable of performing the functions disclosed herein such as a computer system, a laptop or other like device, a tablet device, a smartphone, a personal computer, a server, an Internet of Things device, a cloud computing node, etc. Electronic device 100 may implement some of the features/methods disclosed herein, for example, as described below with respect to any of the method 200, method 300, method 400, and/or method 500.

The electronic device 100 may comprise input devices 110. Some of the input devices 110 may be microphones, keyboards, touchscreens, buttons, toggle switches, cameras, sensors, and/or other devices that allow a user to interact with, and provide input (such as user credentials) to, the electronic device 100. Some of the input devices 110 may be downstream ports coupled to a transceiver (Tx/Rx) 120, which may be transmitters, receivers, or combinations thereof. The Tx/Rx 120 may transmit and/or receive data to and/or from other computing devices via some of the input devices 110. Similarly, the electronic device 100 may comprise a plurality of output devices 140. Some of the output devices 140 may be speakers, a display device (which may also include an input device such as a touchscreen), lights, or any other device that allows a user to interact with, and receive output from, the electronic device 100. Some of the output devices 140 may be upstream ports coupled to another Tx/Rx 120, wherein the Tx/Rx 120 may transmit and/or receive data from other nodes via the upstream ports. The downstream ports and/or the upstream ports may include electrical and/or optical transmitting and/or receiving components. In another example, the electronic device 100 may comprise antennas (not shown) coupled to the Tx/Rx 120. The Tx/Rx 120 may transmit and/or receive data from other computing or storage devices wirelessly via the antennas. In yet other examples, the electronic device 100 may include additional Tx/Rx 120 such that the electronic device 100 may have multiple networking or communication interfaces, for example, such that the electronic device 100 may communicate with a first device using a first communication interface (e.g., such as via the Internet) and may communicate with a second device using a second communication interface (e.g., such as another electronic device 100 without using the Internet).

A processor 130 may be coupled to the Tx/Rx 120 and some of the input devices 110 and/or output devices 140 and may implement the device login authentication and/or pre-authentication security check described herein, such as via login executable code implemented as a device login authentication computer program product 160. In an example, the processor 130 may comprise multi-core processors and/or memory modules 150, which function as data stores, buffers, etc. The processor 130 may be implemented as a general processor or as part of application specific integrated circuits (ASICs), field-programmable gate arrays (FPGAs), and/or digital signal processors (DSPs). Although illustrated as a single processor, the processor 130 is not so limited and may comprise multiple processors. In some examples, the processor 130 may be, or may be referred to as, a central processing unit (CPU).

FIG. 1 also illustrates that the memory module 150 may be coupled to the processor 130 and may be a non-transitory medium to store various types of data. The term "non-transitory" does not encompass transitory propagating signals. Memory module 150 may comprise memory devices including secondary storage, read-only memory (ROM), and random-access memory (RAM). The secondary storage may comprise of disk drives, optical drives, solid-state drives (SSDs), and/or tape drives and may be used for non-volatile storage of data and as an over-flow storage device if the RAM is not large enough to hold all working data. The secondary storage may be used to store programs that are loaded into the RAM when such programs are selected for execution. The ROM may be used to store instructions and/or data that are read during program execution. The ROM may be a non-volatile memory device that may have a small memory capacity relative to the larger memory capacity of the secondary storage. The RAM may be used to store volatile data and perhaps to store instructions. Access to both the ROM and RAM may be faster than to the secondary storage.

The memory module 150 may be used to house the instructions for carrying out the various examples described herein. For example, the memory module 150 may comprise the device login authentication computer program product 160, which may be executed by processor 130.

By programming and/or loading executable instructions onto the electronic device 100, one of the processor 130 and/or the memory module 150 may be changed, transforming the electronic device 100 in part into a particular machine or apparatus, for example, a login authenticating device having the novel functionality taught by the present disclosure.

In some examples, the electronic device 100 may also include a controller 170. The controller 170 may be, for example, an embedded controller in communication with the processor 130. In some examples, the controller 170 is an endpoint security controller. The controller 170 may be capable of secure data communication with the processor 130. In some examples, the controller 170 may include a memory (not shown). In some examples, some data stored in the memory of the controller 170 may be encrypted by the controller 170 prior to storage in the memory of the controller 170 and may be unencrypted or de-encrypted upon retrieval by the controller 170 from the memory of the controller 170.

In some examples, the device login authentication computer program product 160 may include executable instructions (e.g., such as login executable code) to cause the electronic device 100 to implement device login authentication including a pre-authentication security check. The device login authentication, in some examples, may facilitate access by a user to an OS of the electronic device 100 in a two-stage login process. For example, the device login authentication may cause the processor 130 to implement the pre-authentication security check and, responsive to an affirmative result of the pre-authentication security check, implement the OS login service.

For example, a user may provide a user credential, such as a password, to the electronic device 100. Responsive to receipt of the password, the processor 130 may execute the pre-authentication security check to determine whether the received password is a new password, as described above. If the password is a new password, the processor 130 may determine (e.g., calculate, generate, or otherwise derive) a hash value of the OS login service (e.g., such as a hash value of a portion of executable code of, or associated with, the OS login service) and a hash value of the new password. The processor 130 may provide the hash value of the OS login service and the hash value of the new password to the controller 170 for storage by the controller 170 as a reference hash value for the login executable code and a reference hash value for the user credential, respectively. The processor 130 may provide the hash values to the controller 170, in some examples, via secure data communication, such as a private interface or communication channel. Subsequent to providing the hash values to the controller 170, the processor 130 may execute the OS login service to facilitate access to the OS of the electronic device 100 by the user.

If the processor 130 instead determines, via the pre-authentication security check, that the received password is not a new password, the processor 130 may determine whether an update has been performed to the OS login service. For example, the processor 130 may determine whether an update has been performed to the OS login service since an immediately prior or most recent execution of the pre-authentication security check, since a most recent restart of the electronic device 100, or since any other suitable identified or defined point in time. Responsive to determining that an update has been performed to the OS login service, the processor 130 may determine a hash value of the updated OS login service (e.g., such as a hash value of a portion of executable code of, or associated with, the updated OS login service). The processor 130 may provide the hash value of the updated OS login service to the controller 170 for storage by the controller 170 as the reference hash value for the login executable code. In some examples, the controller 170 overwrites or otherwise replaces a prior reference hash value for the login executable code with the hash value of the updated OS login service received from the processor 130. The processor 130 may provide the hash value to the controller 170, in some examples, via secure data communication, such as a private interface or communication channel.

If the processor 130 instead determines, via the pre-authentication security check, that an update has not been performed to the OS login service since the identified or defined point in time, the processor 130 may determine a hash value of the OS login service and the received password. Additionally, after the processor 130 provides the hash value of the updated OS login service to the controller 170, as described above, the processor 130 may determine a hash value of the received password and then follow a same process flow as if the processor 130 instead determined that an update has not been performed to the OS login service since the identified or defined point in time.

Responsive to determining the hash value of the received password, the processor 130 may obtain the reference hash value for the login executable code and the reference hash value for the user credential from the controller 170. The processor 130 may obtain the reference hash values from the controller 170, in some examples, via secure data communication, such as a private interface or communication channel. After obtaining the reference hash values from the controller 170, the processor 130 may compare the hash value of the OS login service to the reference hash value for the login executable code and compare the hash value of the received password to the reference hash value for the user credential. If a result of either comparison is not a match between the compared values, the processor 130 may exit to an interface that prompts the user to enter a user credential. In some examples, the processor 130 may also display an error message, such as indicating a reason for failure of the device login authentication (e.g., incorrect user credential, mismatch between the hash value of the OS login service to the reference hash value for the login executable code, etc.).

If a result of both comparisons is a match between the compared values, the processor 130 may determine whether a new password has been provided by the user. If a new password has been received, the processor 130 may determine a hash value of the new password and then follow a same process flow as if the processor 130 had determined that the initially received password was a new password, as described above. If the processor 130 instead determines that a new password has not been received, the processor 130 may execute the OS login service to facilitate access to the OS by the user. If the processor 130 determines, via the OS login service, that the user credential(s) are valid, the processor 130 may facilitate access to the OS of the electronic device 100 by the user.

Figure 2:
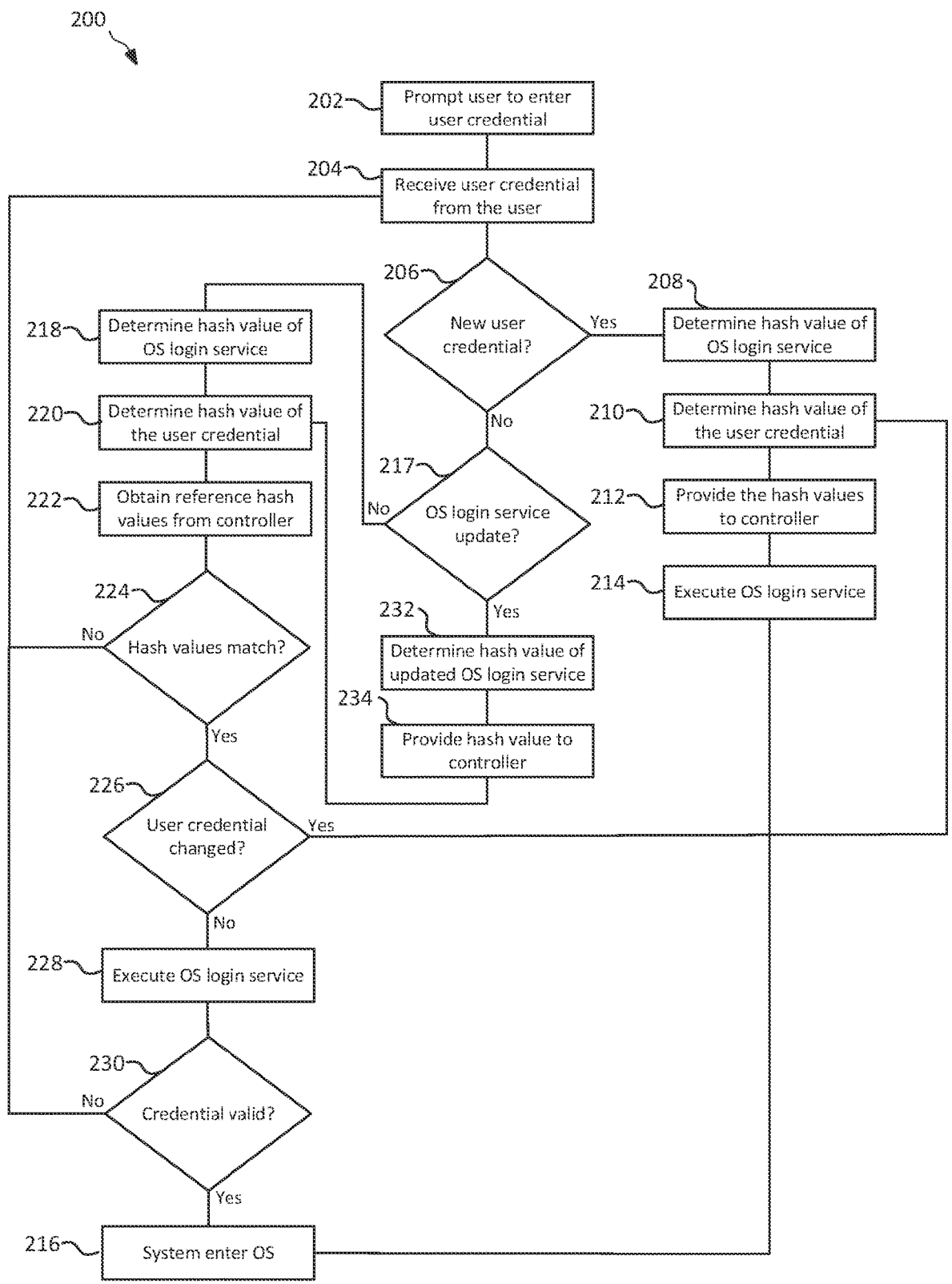
FIG. 2 is a flowchart of a method for electronic device login in accordance with various examples.

FIG. 2 is a flowchart of an example method 200 for electronic device login. In some examples, the method 200 may be suitable for implementation on, in, and/or by an electronic device, such as the electronic device 100 of FIG. 1. For example, in some implementations the method 200 may be embodied as the device login authentication computer program product 160 and may be performed in part by the processor 130 and in part by the controller 170. Accordingly, the method 200 may be implemented in part as computer-executable instructions or code, stored on a computer-readable medium, such as the memory module 150 of FIG. 1, which, when executed by a processor, such as the processor 130 of FIG. 1, may cause the processor 130 to execute the computer-executable instructions to perform operations. For example, the processor 130 may execute the computer-executable instructions to implement or perform device login authentication, including a pre-authentication security check. The method 200 may be implemented by the electronic device 100, in some examples, to facilitate or deny access by a user to an OS of the electronic device 100 via a multi-stage device login authentication process.

At operation 202, a user is prompted to enter a user credential. In some examples, the user credential includes a password. In other examples, the user credential includes a user name. In yet other examples, the user credential includes both a password and a user name. The user may be prompted to enter the user credential, in some examples, via a graphical user interface presented on, or by, the electronic device 100.

At operation 204, the user credential is received from the user. The user credential may be received in any suitable form, such as biometric (e.g., a fingerprint scan, a retinal scan, etc.), audible (e.g., a spoken phrase or other sound), or via a user input device such as a keyboard, keypad, touch sensitive screen, or any other suitable form of user input device. In some examples, the user credential may include a first component (e.g., one of user name or password) received in a first form and a second component (e.g., other of user name or password) received in a second form.

At operation 206, the processor 130 determines whether the user credential is a new user credential. For example, the processor 130 may determine whether a password provided as, or as a component of, the user credential is a new password, as described above herein. If the processor 130 determines that the user credential is a new user credential, the method 200 may proceed to operation 208.

At operation 208, the processor 130 determines a hash value of an OS login service of the electronic device 100, as described above herein, and proceeds to operation 210. At operation 210, the processor 130 determines a hash value of the received user credential (e.g., as received at operation 204) and proceeds to operation 212.

At operation 212, the processor 130 provides the hash value of the OS login service to the controller 170 for storage as a reference hash value for the login executable code. The processor 130 may also provide the hash value of the received user credential to the controller 170 for storage as a reference hash value for the user credential. The processor 130 may provide the hash values to the controller 170, in some examples, via secure data communication, such as a private interface or communication channel. Subsequent to providing the hash values to the controller 170, the method 200 may proceed to operation 214.

At operation 214, the processor 130 executes the OS login service and, based on that execution, facilitates user access to the OS of the electronic device 100 at operation 216.

Returning to operation 206, if the processor 130 determines that the user credential is not a new user credential, the method 200 may proceed to operation 217. At operation 217, the processor 130 determines whether an update has been performed to the OS login service since an immediately prior or most recent prior execution of the method 200, since a most recent restart of the electronic device 100, or since any other suitable identified or defined point in time. If the processor 130 determines that an update has not been performed to the OS login service, the method 200 may proceed to operation 218.

At operation 218, the processor 130 determines a hash value of an OS login service of the electronic device 100, as described above herein, and proceeds to operation 220. At operation 220, the processor 130 determines a hash value of the received user credential (e.g., as received at operation 204) and proceeds to operation 222.

At operation 222, the processor 130 may obtain the reference hash value for the login executable code and the reference hash value for the user credential from the controller 170. The processor 130 may obtain the reference hash values from the controller 170, in some examples, via secure data communication, such as a private interface or communication channel. Subsequent to obtaining the reference hash values from the controller 170, the method 200 may proceed to operation 224.

At operation 224, the processor 130 may compare the hash value of the OS login service to the reference hash value for the login executable code and compare the hash value of the received password to the reference hash value for the user credential. If the processor 130 determines that a result of either comparison is not a match between the compared values, the method 200 may return to operation 202. In some examples, the processor 130 may also display an error message along with the user credential prompt described above with respect to operation 202, such as to indicate a reason for the method 200 returning to operation 202 (e.g., such as an incorrect user credential, mismatch between the hash value of the OS login service to the reference hash value for the login executable code, etc.). If the processor 130 instead determines that the result of both comparisons is a match between the compared values, the method 200 may proceed to operation 226.

At operation 226, the processor 130 determines whether, subsequent to, or substantially concurrently with, the user providing the user credential received at operation 204, a new user credential has been received. For example, after authenticating access to the system via the user credential (e.g., a user password), the user may provide the new user credential (e.g., such as a new user password). In an example, the new user credential is received subsequent to a previously provided user credential (e.g., the user credential received at operation 204), such that authentication to change to the new user credential is determined in response to a value of the previously provided password. If the processor 130 determines that a new user credential has been received, the method 200 proceeds to operation 210. If the processor 130 determines that a new user credential has not been received, the method 200 proceeds to operation 228.

At operation 228, the processor 130 executes the OS login service and proceeds to operation 230. At operation 230 the processor 130 determines whether the user credential received at operation 204 is valid. For example, the processor 130 may compare the user credential to a stored user credential to determine whether the received user credential matches the stored user credential. If the processor 130 determines, via the OS login service, that the user credential(s) are valid, the processor 130 may facilitate user access to the OS of the electronic device 100 at operation 216.

Returning to operation 217, if the processor 130 determines that an update has been performed to the OS login service, the method 200 may proceed to operation 232.

At operation 232, the processor 130 determines a hash value of the updated OS login service of the electronic device 100, as described above herein, and proceeds to operation 234. At operation 234, the processor 130 provides the hash value of the updated OS login service to the controller 170 for storage as a reference hash value for the login executable code. The processor 130 may provide the hash value of the updated OS login service to the controller 170, in some examples, via secure data communication, such as a private interface or communication channel. In some examples, providing the hash value of the updated OS login service to the controller 170 causes the controller 170 to overwrite or otherwise replace a prior reference hash value for the login executable code with the hash value of the updated OS login service received from the processor 130. Subsequent to providing the hash value of the updated OS login service to the controller 170, the method 200 may proceed to operation 220.

Figure 3:
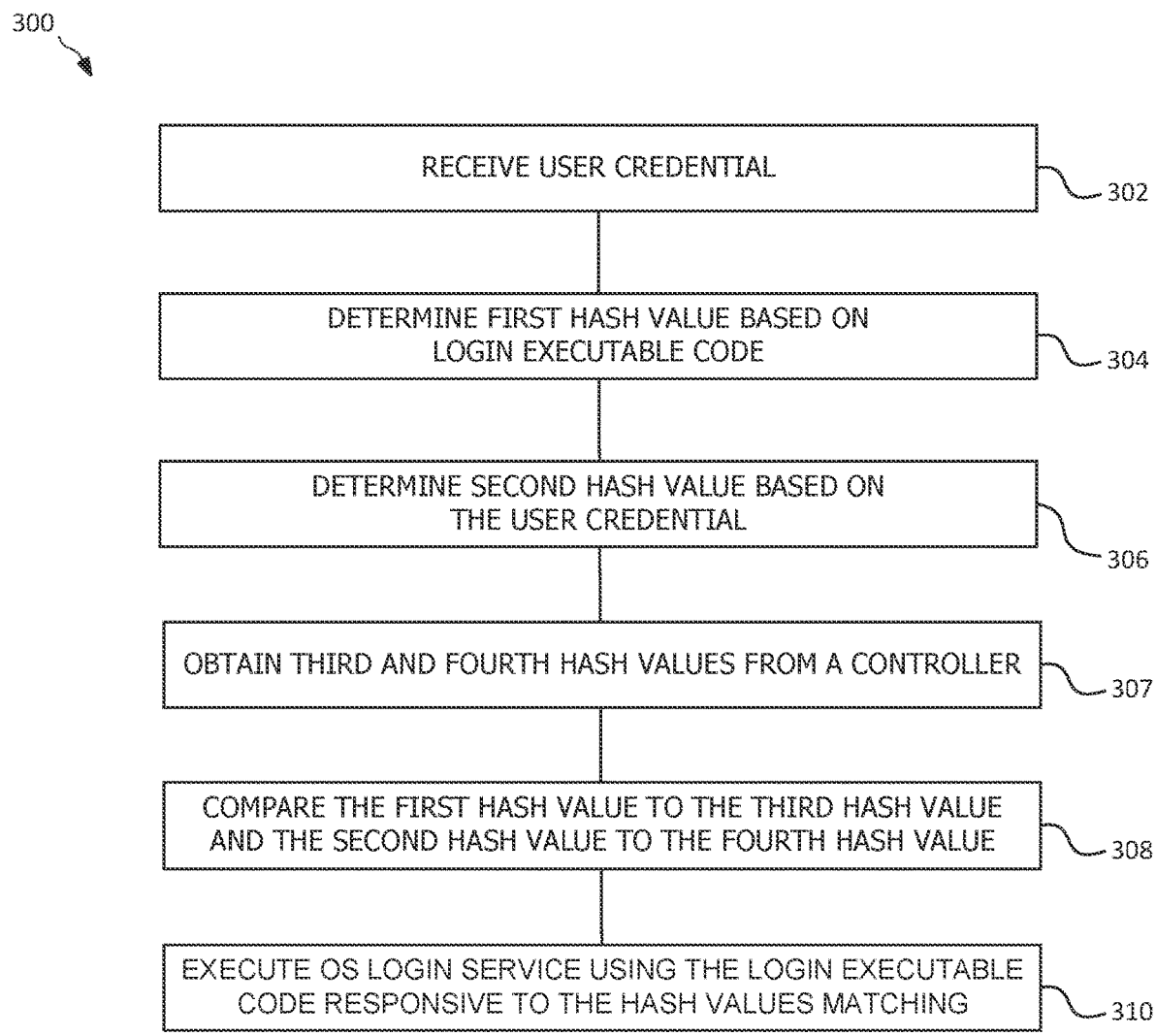
FIG. 3 is a flowchart of a method for electronic device login in accordance with various examples.

FIG. 3 is a flowchart of an example method 300 for electronic device login. In some examples, the method 300 may be suitable for implementation on, in, and/or by an electronic device, such as the electronic device 100 of FIG. 1. For example, in some implementations the method 300 may be embodied as the device login authentication computer program product 160 and may be performed in part by the processor 130 and in part by the controller 170. Accordingly, the method 300 may be implemented in part as computer-executable instructions or code, stored on a computer-readable medium, such as the memory module 150 of FIG. 1, which, when executed by a processor, such as the processor 130 of FIG. 1, may cause the processor 130 to execute the computer-executable instructions to perform operations. For example, the processor 130 may execute the computer-executable instructions to implement or perform device login authentication, including a pre-authentication security check. The method 300 may be implemented by the electronic device 100, in some examples, to facilitate or deny access by a user to an OS of the electronic device 100 via a multi-stage device login authentication process.

At operation 302, a user credential usable by the login executable code to perform device login authentication is received. The user credential may be provided by a user responsive to a prompt and in any suitable form, using any suitable input device, as further described elsewhere herein.

At operation 304, a first hash value based on the login executable code is determined. The first hash value may be determined, for example, by the processor 130. The login executable code may be a portion of executable code of, or associated with, an OS login service, as further described elsewhere herein.

At operation 306, a second hash value based on the user credential is determined. The second hash value may be determined, for example, by the processor 130.

At operation 307, a third hash value and a fourth hash value are obtained from the controller. For example, the processor 130 may obtain the third hash value and the fourth hash value from the controller 170, as further described elsewhere herein, according to a secure communication method. In some examples, the third hash value is a reference hash value for the login executable code and the fourth hash value is a reference hash value for the user credential.

At operation 308, the first hash value is compared to the third hash value and the second hash value is compared to the fourth hash value. In some examples, if the first hash value does not match the third hash value or the second hash value does not match the fourth hash value, the method 300 may terminate. If the first hash value matches the third hash value and the second hash value matches the fourth hash value, in some examples, the method 300 proceeds to operation 310.

At operation 310, an OS login service is executed using the login executable code, responsive to the first hash value matching the third hash value and the second hash value matching the fourth hash value, as further described elsewhere herein.

Figure 4:
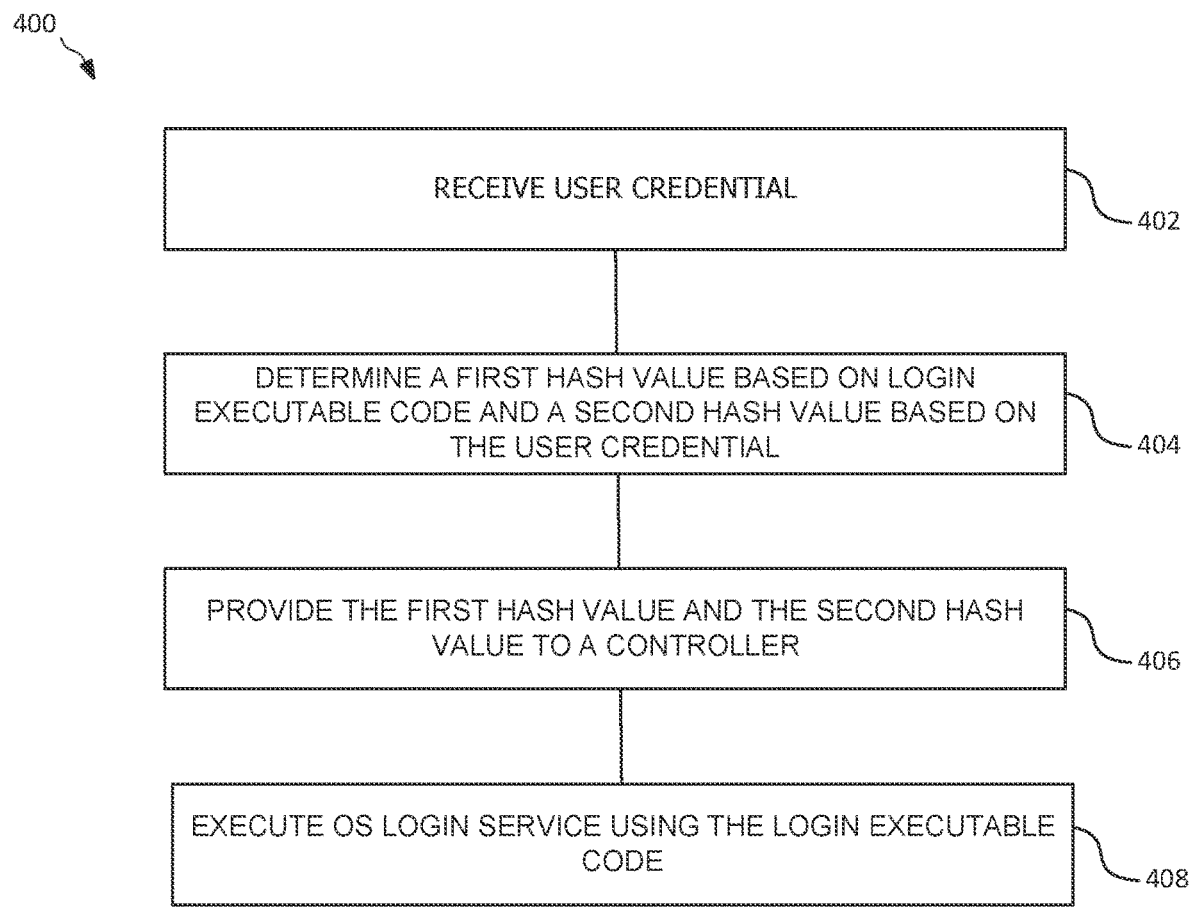
FIG. 4 is a flowchart of a method for electronic device login in accordance with various examples.

FIG. 4 is a flowchart of an example method 400 for electronic device login. In some examples, the method 400 may be suitable for implementation on, in, and/or by an electronic device, such as the electronic device 100 of FIG. 1. For example, in some implementations the method 400 may be embodied as the device login authentication computer program product 160 and may be performed in part by the processor 130 and in part by the controller 170. Accordingly, the method 400 may be implemented in part as computer-executable instructions or code, stored on a computer-readable medium, such as the memory module 150 of FIG. 1, which, when executed by a processor, such as the processor 130 of FIG. 1, may cause the processor 130 to execute the computer-executable instructions to perform operations. For example, the processor 130 may execute the computer-executable instructions to implement or perform device login authentication, including a pre-authentication security check. The method 400 may be implemented by the electronic device 100, in some examples, to facilitate or deny access by a user to an OS of the electronic device 100 responsive to receipt of a new user credential.

At operation 402, a user credential usable by the login executable code in device login authentication is received. The user credential may be provided by a user responsive to a prompt and in any suitable form, using any suitable input device, as further described elsewhere herein.

At operation 404, responsive to the user credential being a new credential, a first hash value based on the login executable code and a second hash value based on the user credential are determined. For example, the processor 130 may determine that the user credential is a new user credential, provided as described above herein. The login executable code may be a portion of executable code of, or associated with, an OS login service, as further described elsewhere herein.

At operation 406, the first hash value and the second hash value are provided to a controller to facilitate usability of the first hash value and the second hash value in subsequent device login authentication attempts. For example, the processor 130 may provide the first hash value and the second hash value to the controller 170, as further described elsewhere herein, according to a secure communication method. In some examples, providing the first hash value and the second hash value to the controller causes the controller to store the first hash value as a reference hash value for the login executable code and the second hash value as a reference hash value for the user credential.

At operation 408, the OS login service is executed using the login executable code, as further described elsewhere herein.

Figure 5:
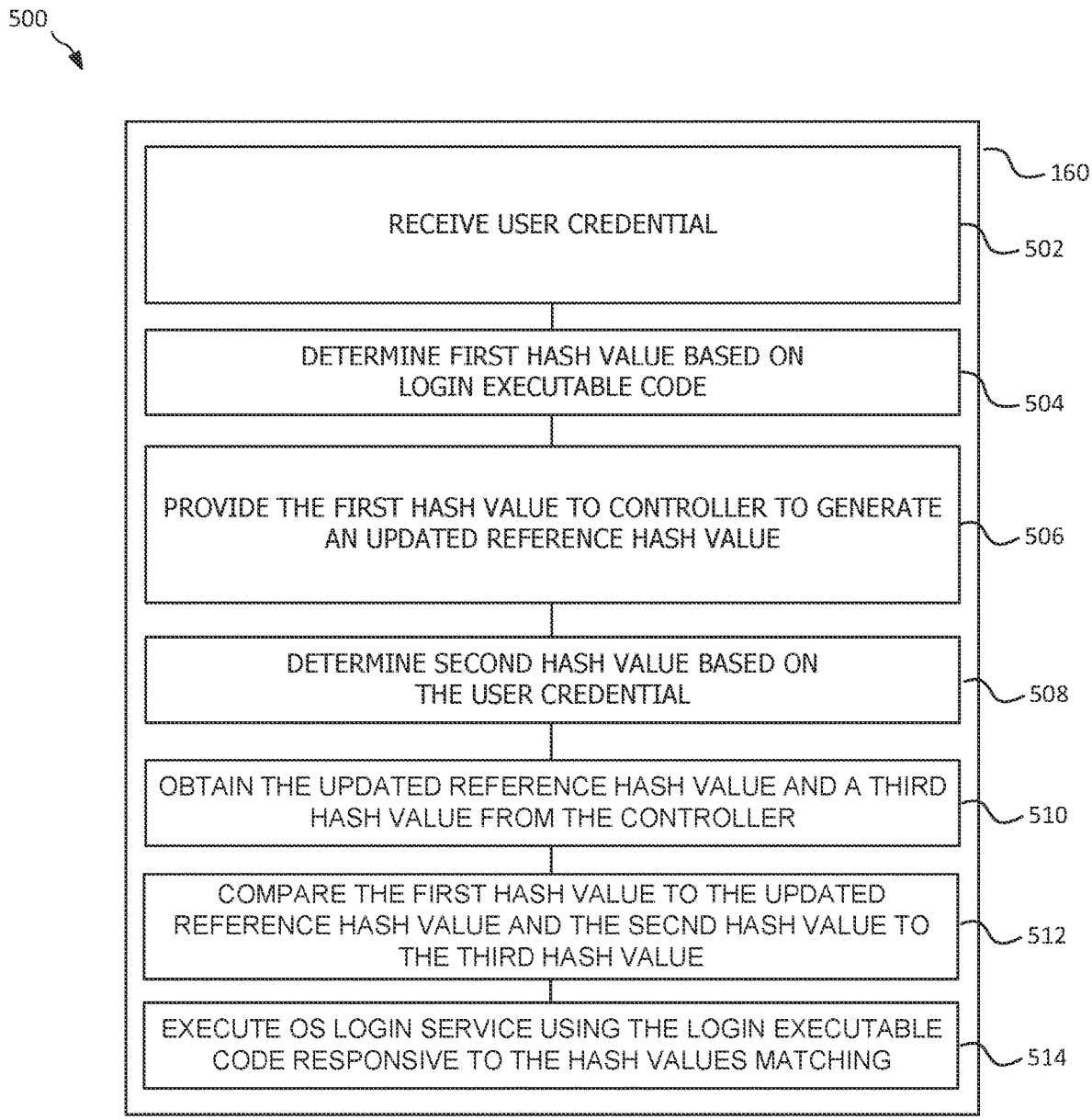
FIG. 5 is a flowchart of a method for electronic device login in accordance with various examples.

FIG. 5 is a flowchart of an example method 500 for electronic device login. In some examples, the method 500 may be suitable for implementation on, in, and/or by an electronic device, such as the electronic device 100 of FIG. 1. For example, in some implementations the method 500 may be embodied as the device login authentication computer program product 160 and may be performed in part by the processor 130 and in part by the controller 170. Accordingly, the method 500 may be implemented in part as computer-executable instructions or code, stored on a computer-readable medium, such as the memory module 150 of FIG. 1, which, when executed by a processor, such as the processor 130 of FIG. 1, may cause the processor 130 to execute the computer-executable instructions to perform operations. For example, the processor 130 may execute the computer-executable instructions to implement or perform device login authentication, including a pre-authentication security check. The method 500 may be implemented by the electronic device 100, in some examples, to facilitate or deny access by a user to an OS of the electronic device 100 responsive to an update of an OS login service of the electronic device 100.

At operation 502, a user credential usable by the login executable code in device login authentication is received. The user credential may be provided by a user responsive to a prompt and in any suitable form, using any suitable input device, as further described elsewhere herein.

At operation 504, a first hash value based on the login executable code is determined. The login executable code may be a portion of executable code of, or associated with, an OS login service, as further described elsewhere herein. In some examples, the login executable code of the OS login service may have been updated since a previous hash value based on the login executable code was determined and provided to the controller for storage as a reference hash value.

At operation 506, the first hash value is provided to the controller to cause the controller to replace the reference hash value stored by the controller with the first hash value to generate an updated reference hash value that is stored by the controller.

At operation 508, a second hash value based on the user credential is determined. The second hash value may be determined, for example, by the processor 130.

At operation 510, the updated reference hash value and a third hash value are obtained from the controller. In some examples, the third hash value may be a reference hash value for the user credential, as further described elsewhere herein.

At operation 512, the first hash value is compared to the updated reference hash value and the second hash value is compared to the third hash value. In some examples, if the first hash value does not match the updated reference hash value or the second hash value does not match the third hash value, the method 500 may terminate. If the first hash value matches the updated reference hash value and the second hash value matches the third hash value, in some examples, the method 500 proceeds to operation 514.

At operation 514, an OS login service is executed using the login executable code, responsive to the first hash value matching the updated reference hash value and the second hash value matching the third hash value, as further described elsewhere herein.

The above discussion is meant to be illustrative of the principles and various examples of the present disclosure. Numerous variations and modifications are contemplated. It is intended that the following claims be interpreted to embrace all such variations and modifications.

What is claimed is:

1. An electronic device, comprising:
a memory storing login executable code;
a controller; and
a central processing unit (CPU) coupled to the controller, the CPU to:
receive a user credential usable by the login executable code to perform device login authentication;

determine a first hash value based on the login executable code;

determine a second hash value based on the user credential;

obtain a third hash value and a fourth hash value from the controller, wherein the third hash value is a reference hash value for the login executable code, and wherein the fourth hash value is a reference hash value for the user credential;

compare the first hash value to the third hash value;

compare the second hash value to the fourth hash value; and execute an operating system (OS) login service using the login executable code responsive to the first hash value matching the third hash value and the second hash value matching the fourth hash value.

2. The electronic device of claim 1, wherein the user credential includes one of a password or a user name.

3. The electronic device of claim 1, wherein the user credential includes a user name and a password.

4. The electronic device of claim 1, wherein the login executable code is a portion of executable code associated with an OS login service of the electronic device.

5. The electronic device of claim 1, wherein the OS login service validates the user credential to facilitate access to an OS of the electronic device.

6. The electronic device of claim 1, wherein the CPU is further to receive, from a user input communicatively coupled to the CPU, the user credential.

7. The electronic device of claim 1, wherein the controller is at least one of an embedded controller or an endpoint security controller.

8. The electronic device of claim 1, wherein the CPU is further to determine the first hash value and the second hash value, based on determining that the user credential is not a new user credential.

9. The electronic device of claim 1, wherein the CPU is further to obtain the third hash value and the fourth hash value from the controller, based on determining that the user credential is not a new user credential.

* * * * *